United States Patent
Shibata et al.

(10) Patent No.: US 7,776,966 B2
(45) Date of Patent: Aug. 17, 2010

(54) THERMOPLASTIC RESIN COMPOSITION

(75) Inventors: Takao Shibata, Hyogo (JP); Akira Takaki, Hyogo (JP)

(73) Assignee: Kaneka Corporation, Osaka (JP)

( * ) Notice: Subject to any disclaimer, the term of this patent is extended or adjusted under 35 U.S.C. 154(b) by 594 days.

(21) Appl. No.: 11/658,755

(22) PCT Filed: Jul. 15, 2005

(86) PCT No.: PCT/JP2005/013166

§ 371 (c)(1), (2), (4) Date: Jan. 29, 2007

(87) PCT Pub. No.: WO2006/011384

PCT Pub. Date: Feb. 2, 2006

(65) Prior Publication Data

US 2008/0319140 A1    Dec. 25, 2008

(30) Foreign Application Priority Data

Jul. 28, 2004 (JP) ............................. 2004-220197
Sep. 9, 2004 (JP) ............................. 2004-262912
Nov. 5, 2004 (JP) ............................. 2004-322634

(51) Int. Cl.
C08F 8/00 (2006.01)
(52) U.S. Cl. ..................... 525/100; 528/32; 528/392
(58) Field of Classification Search ............. 525/100
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 4,332,715 A | 6/1982 | Ona et al. | |
| 4,994,523 A | 2/1991 | Sasaki et al. | |
| 5,045,595 A | 9/1991 | Wang | |
| 5,218,014 A | 6/1993 | Matsumoto et al. | |
| 5,219,932 A | 6/1993 | Yamamoto et al. | |
| 5,232,997 A | 8/1993 | Itoh et al. | |
| 2003/0134977 A1 | 7/2003 | Lai et al. | |
| 2004/0039077 A1 | 2/2004 | Baba et al. | |
| 2004/0220302 A1 | 11/2004 | Saegusa et al. | |
| 2005/0038149 A1 | 2/2005 | Hashimoto et al. | |
| 2009/0005506 A1* | 1/2009 | Shibata et al. ............... 525/63 |

FOREIGN PATENT DOCUMENTS

| | | |
|---|---|---|
| JP | 57-30754 A | 2/1982 |
| JP | 4-089857 A | 3/1992 |
| JP | 5-209129 A | 8/1993 |
| JP | 9-136929 A | 5/1997 |
| JP | 9-328617 A | 12/1997 |
| JP | 09328617 A * | 12/1997 |
| JP | 10-237266 A | 9/1998 |
| JP | 2002020438 A | 1/2002 |
| JP | 2003238639 A | 8/2003 |
| WO | WO03068835 A1 | 8/2003 |
| WO | WO03091342 A1 | 11/2003 |

OTHER PUBLICATIONS

"Polycarbonate Resin Handbook" (Handbook of Polycarbonate Resins), edited by Seiichi Honma, Nikkan Kogyo Shimbun Co., Ltd., Aug. 28, 1992, pp. 155-156.
"Silicone Handbook" (Handbook of Silicones), edited by Kunio ITO, Nikkan Kogyo Shimbun Co., Ltd., Aug. 31, 1990, pp. 153-154.
International Search Report for International Application No. PCT/JP2005/013172 dated Sep. 13, 2005.
Notification of Transmittal of Translation of the International Preliminary Report on Patentability dor Internaitonal Application No. PCT/JP2005/013172 dated Feb. 8, 2007.

* cited by examiner

*Primary Examiner*—Randy Gulakowski
*Assistant Examiner*—Lindsay Nelson
(74) *Attorney, Agent, or Firm*—Sughrue Mion, PLLC

(57) ABSTRACT

The present invention provides a thermoplastic resin composition that excels in the slidability and mold release ability at molding of thermoplastic resin by virtue of mixing of a small amount of a polyorganosiloxane-containing graft copolymer excellent in powder characteristics. The present invention can solve the above-mentioned problem by providing thermoplastic resin composition comprising 0.01 to 5% by weight of a polyorganosiloxane-containing graft copolymer (C) and 99.99 to 95% by weight of a thermoplastic resin (D), wherein the polyorganosiloxane-containing graft copolymer (C) is obtainable by polymerizing 40 to 10 parts by weight of a vinyl monomer (B) in the presence of 60 to 90 parts by weight of a polyorganosiloxane (A) with a proviso that a sum of (A) and (B) is 100 parts by weight, a graft ratio of the polyorganosiloxane-containing graft copolymer (C) is less than 1%, and a content of methyl ethyl ketone-insoluble matter in the polyorganosiloxane-containing graft copolymer (C) is 3% by weight or less.

2 Claims, No Drawings

THERMOPLASTIC RESIN COMPOSITION

FIELD OF THE INVENTION

The invention relates to a thermoplastic resin composition comprising a polyorganosiloxane-containing graft copolymer excellent in the powder characteristics and capable of improving the mold release ability and slidability at molding of a thermoplastic resin and a thermoplastic resin.

BACKGROUND ART

Since thermoplastic resins containing no rubber component or thermoplastic resins mixed with inorganic fillers such as glass fiber are in lack of flexibility, it is difficult, for example, in the case of releasing a molded product from a mold after extrusion molding and in an extreme case, the molded product may be broken at the time of release from a mold. Conventionally, as a method for improving the release property of these thermoplastic resins has been generally employed a method of adding a lubricant such as a fatty acid or its metal salt, wax, or a higher alcohol, a release agent such as silicone oil, or the like to the resins (e.g., refer to Non-Patent Document 1).

However, a lubricant aims mainly to moderate the friction among pellets at the time of extrusion molding or to improve the thermal stability of resins and therefore, it cannot be expected for the lubricant to have a function as a mold release agent simultaneously and a large amount of the lubricant has to be added to improve the mold release ability. A molded product to be obtained from a mixture containing the lubricant may be considerably deteriorated in the mechanical properties or in the case of high temperature molding, appearance defects may be caused due to decomposition gas emission and further, the mold release effect may be decreased due to decomposition of an additive component.

Molded products of thermoplastic resins have been employed widely in various fields of AV appliances such as video cassette recorders, DVD players, and the like and office automation equipments such as printers and copying machines. One of required properties for those molded products is slidability. However, if a thermoplastic resin is used alone, the slidability is sometimes unsatisfactory or further improvement of the slidability is required and as one of measures for the problem, a method of adding silicone oil that is excellent in chemical and physical stability and usable as a lubricant as well as a mold release agent to thermoplastic resins is proposed (e.g., reference to Non-Patent Document 2).

However, the conventional method of adding silicone oil has a problem that the molded product surface may be deteriorated if the addition amount of the silicone oil is high.

Non-Patent Document 1: "Polycarbonate Resin Handbook" (Handbook of Polycarbonate Resins), edited by Seiichi HONMA, Nikkan Kogyo Shimbun Co., Ltd., Aug. 28, 1992, p. 155-156

Non-Patent Document 2: "Silicone Handbook" (Handbook of Silicones), edited by Kunio ITO, Nikkan Kogyo Shimbun Co., Ltd., Aug. 31, 1990, p. 153-154

DISCLOSURE OF THE INVENTION

Problem to be Solved by the Invention

The present invention aims to solve the above-mentioned problems and provides a thermoplastic resin composition excellent in the mold release ability at the time of molding and the thermoplastic resin composition gives a molded product excellent in the surface appearance and slidability to a molded product.

Means for Solving the Problems

The inventors have conducted extensive studies in order to solve the above-described problems, and found that a specific polyorganosiloxane-containing graft copolymer is excellent in powder characteristics and is capable of considerably improving the mold release ability and slidability in the case that a small amount of the polyorganosiloxane-containing graft copolymer is added to a thermoplastic resin. These findings have led to completion of the present invention.

That is, the present invention provides a thermoplastic resin composition excellent in mold release ability and slidability which comprises 0.01 to 5% by weight of a polyorganosiloxane-containing graft copolymer (C) and 99.99 to 95% by weight of a thermoplastic resin (D), wherein the polyorganosiloxane-containing graft copolymer (C) is obtainable by polymerizing 40 to 10 parts by weight of a vinyl monomer (B) in the presence of 60 to 90 parts by weight of a polyorganosiloxane (A) with a proviso that the sum of (A) and (B) is 100 parts by weight, a graft ratio of the polyorganosiloxane-containing graft copolymer (C) is less than 1%, and a content of methyl ethyl ketone-insoluble matter is 3% by weight or less(claim 1).

The present invention also relates to the thermoplastic resin composition according to claim 1, wherein the vinyl monomer (B) is at least one selected from the group consisting of aromatic vinyl monomer, vinyl monomer cyanide, (meth) acrylic acid ester monomer, carboxyl group-containing vinyl monomer, and maleimide monomer (claim 2).

EFFECTS OF THE INVENTION

The polyorganosiloxane-containing graft copolymer of the present invention is excellent in powder characteristics and the resin composition obtainable by blending the copolymer with a thermoplastic resin is excellent in the mold release ability at the time of molding, surface appearance, and slidability in form of a molded product.

BEST MODE FOR CARRYING OUT OF THE INVENTION

A polyorganosiloxane-containing graft copolymer (C) of the present invention is obtained by polymerizing 40 to 10 parts by weight of a vinyl monomer (B) in the presence of 60 to 90 parts by weight of a polyorganosiloxane (A) (the sum of (A) and (B) is 100 parts by weight).

The organosiloxane (A) to be used in the present invention has a structural unit defined by a general formula; $R_m SiO_{(4-m)/2}$ (wherein R denotes a substituted or unsubstituted monovalent hydrocarbon group and m denotes an integer of 0 to 3) and has a linear, branched, or cyclic structure and preferably an organosiloxane having a cyclic structure. Examples of substituted or unsubstituted monovalent hydrocarbon group of the organosiloxane include methyl group, ethyl group, propyl group, phenyl group and cyano-substituted hydrocarbon group derived from these groups and the like.

As specific examples of the organosiloxane, there may be mentioned hexamethylcyclotrisiloxane (D3), octamethylcyclotetrasiloxane (D4), decamethylcyclopentasiloxane (D5), dodecamethylcyclohexasiloxane (D6), trimethyltriphenylcyclotrisiloxane and besides these cyclic compounds, the examples may also include linear or branched organosiloxane. These organosiloxanes may be used alone or two or more of them may be used in combination.

In polymerization of the polyorganosiloxane (A) in the polyorganosiloxane-containing graft copolymer (C) of the present invention, a graft crosslinking agent is used and if necessary, a crosslinking agent may be used.

As the graft crosslinking agent to be used in the present invention, a compound having a hydrolyzable silicon group and a radical reactive group such as a polymerizable unsaturated bond is preferable. Examples of the graft crosslinking agent may include p-vinylphenylmethyldimethoxysilane, p-vinylphenylethyldimethoxysilane, 2-(p-vinylphenyl)ethylmethyldimethoxysilane, 3-(p-vinylbenzoyloxy)propylmethyldimethoxysilane, p-vinylphenylmethyldimethoxysilane, vinylmethyldimethoxysilane, tetravinyltetramethylcyclosiloxane, allylmethyldimethoxysilane, γ-mercaptopropylmethyldimethoxysilane, and γ-methacryloxypropylmethyldimethoxysilane and the like (in Examples, γ-is expressed as 3-).

In terms of the mold release property and slidability, so-called bifunctional mercaptosilane compound each having two alkoxy groups or bifunctional methacryloxysilane compound is preferable. In terms of slidability, bifunctional methacryloxysilane compound is particularly preferable.

As bifunctional mercaptosilane compound is exemplified γ-mercaptopropylmethyldimethoxysilane and as bifunctional methacryloxysilane compound is exemplified γ-methacryloxypropylalkyldialkoxysilane.

The used amount of the graft crosslinking agent is preferably 0.01 to 0.4% by weight in 100% by weight of the total amount of the organosiloxane and the graft crosslinking agent in terms of the mold release ability and slidability. It is more preferably 0.03 to 0.35% by weight and even more preferably 0.04 to 0.3% by weight. In terms of the slidability, it is most preferably 0.05 to 0.25% by weight.

If the used amount of the graft crosslinking agent is less than 0.01% by weight, it tends to be difficult to obtain the polyorganosiloxane-containing graft copolymer (C) in powder state and if the used amount of the graft crosslinking agent is increased, for example, exceeding 0.4% by weight, the effect to improve the mold release ability, slidability and impact resistance tends to be lowered.

The compounds exemplified as the graft crosslinking agent are all bifunctional compound each having two hydrolyzable groups and they are particularly preferable. In addition, tri- or tetra-functional compound having three or four hydrolyzable groups in one molecule is also usable as the graft crosslinking agent and the tri- or tetra-functional compound may be also separately classified as a crosslinking agent.

Examples of these compounds are tri-functional crosslinking agent such as methyltrimethoxysilane, phenyltrimethoxysilane, and ethyltriethoxysilane; and tetra-functional crosslinking agent such as tetraethoxysilane, 1,3-bis[2-(dimethoxymethylsilyl)ethyl]benzene, 1,4-bis[2-(dimethoxymethylsilyl)ethyl]benzene, 1,3-bis[1-(dimethoxymethylsilyl)ethyl]benzene, 1-[1-(dimethoxymethylsilyl)ethyl]-3-[2-(dimethoxymethylsilyl)ethyl]benzene, and 1-[1-(dimethoxymethylsilylethyl)-4-[2-(dimethoxymethylsilyl)ethyl]benzene. These compounds may be used alone as a crosslinking agent or two or more of them may be used in form of a mixture.

In the case of using the above-mentioned crosslinking agent, the additive amount is, for example, 1% by weight or lower and preferably 0.3% by weight or lower with respect to the polyorganosiloxane (A). If it exceeds 1% by weight, the flexibility of the polyorganosiloxane (A) is deteriorated and therefore, the effect to improve the mold release ability and the slidability tends to be lowered. In order to maintain the characteristics regarding the graft ratio or insoluble matter of the present invention, the characteristics may be easily maintained without use of crosslinking agent.

The amount of the polyorganosiloxane (A) in the polyorganosiloxane-containing graft copolymer (C) of the present invention is preferably 60 to 90 parts by weight. In terms of the mold release ability, it is more preferably 65 to 85 parts by weight and even more preferably 70 to 85 parts by weight. In terms of the slidability, the lower limit of the amount of the polyorganosiloxane (A) is 60 parts by weight, preferably 63 parts by weight, more preferably 65 parts by weight, even more preferably 67 parts by weight, and most preferably 70 parts by weight.

The upper limit of the polyorganosiloxane (A) is 90 parts by weight, preferably 87 parts by weight, more preferably 85 parts by weight, even more preferably 84 parts by weight, and most preferably 80 parts by weight. If the amount of the polyorganosiloxane (A) is less than 60 parts by weight, the effect to improve the mold release ability, the slidability, and the impact resistance tends to be lowered and on the contrary, if it exceeds 90 parts by weight, it tends to be difficult to obtain the polyorganosiloxane-containing graft copolymer (C) in powder state.

The polyorganosiloxane (A) employed in the polyorganosiloxane-containing graft copolymer (C) of the present invention is preferable to be produced by methods described in U.S. Pat. Nos. 2,891,920 and 3,294,725: that is, a method of emulsifying and dispersing an organosiloxane and a graft crosslinking agent in water by high speed shearing using a high speed stirrer such as a homogenizer in the presence of an emulsifier such as an alkylbenzenesulfonic acid and successively carrying out emulsion polymerization.

The alkylbenzenesulfonic acid is preferable since it works as an emulsifier for emulsion polymerization of the polyorganosiloxane and also as a polymerization initiator. The emulsifier is used generally in an amount of 0.1 to 10% by weight and preferably 0.3 to 5% by weight with respect to the total amount of the organosiloxane and graft crosslinking agent. The polymerization temperature is generally 5 to 100° C.

The vinyl monomer (B) employed in the polyorganosiloxane-containing graft copolymer (C) of the present invention is a component to be used for securing the compatibility of the polyorganosiloxane-containing graft copolymer (C) and the thermoplastic resin (D) and uniformly dispersing the polyorganosiloxane-containing graft copolymer (C) in the thermoplastic resin (D).

As specific examples of the vinyl monomer (B) may be (i) aromatic vinyl type monomers such as styrene, α-methylstyrene, p-methylstyrene, p-butylstyrene, chlorostyrene, and bromostyrene; (ii) cyanovinyl type monomers such as acrylonitrile and methacrylonitrile; (iii) (meth)acrylic acid ester type monomers such as methyl acrylate, ethyl acrylate, propyl acrylate, butyl acrylate, 2-ethylhexyl acrylate, glycidyl acrylate, hydroxyethyl acrylate, methyl methacrylate, ethyl methacrylate, butyl methacrylate, lauryl methacrylate, glycidyl methacrylate, and hydroxyethyl methacrylate; (iv) carboxyl group-containing vinyl type monomers such as itaconic acid, (meth)acrylic acid, fumaric acid, and maleic acid; (v) maleimide type monomers such as maleimide, N-methylmaleimide, N-ethylmaleimide, N-propylmaleimide, N-butylmaleimide, N-phenylmaleimide, and N-(p-methylphenyl) maleimide.

These monomers may be used alone or two or more of them may be used in combination. Although polyfunctional vinyl monomers having two or more polymerizable unsaturated bonds in a molecule may be used. In terms of control of the graft ratio and the methyl ethyl ketone-insoluble matter, the graft ratio and the methyl ethyl ketone-insoluble matter may be easily controlled without use of such monomer is used.

The used amount of the vinyl monomer (B) in the polyorganosiloxane-containing graft copolymer (C) of the present invention is 10 to 40 parts by weight, and in terms of the mold release ability, preferably 15 to 35 parts by weight, and more preferably 15 to 30 parts by weight. Further, in terms of the slidability, the lower limit of the used amount is preferably 13 parts by weight, more preferably 15 parts by weight, even more preferably 16 parts by weight, and most preferably 20 parts by weight. In terms of the slidability, the upper limit of the used amount is preferably 37 parts by weight, more preferably 35 parts by weight, even more preferably 33 parts by weight, and most preferably 30 parts by weight. If the used amount of the vinyl monomer (B) is less than 10 parts by weight, it tends to be difficult to obtain the polyorganosiloxane-containing graft copolymer (C) in powder state and on the contrary, if it exceeds 40 parts by weight, the effect to improve the mold release ability, the slidability, and the impact resistance tends to be lowered.

The polyorganosiloxane-containing graft copolymer (C) of the present invention is obtained by polymerizing the vinyl monomer (B) in the presence of the polyorganosiloxane (A) (the sum of A and B is 100 parts by weight) and the polymerization in this case is generally carried out by a common emulsion polymerization.

As a method for separating polymer from latex of the graft copolymer (C) obtained by the above-mentioned emulsion polymerization may be exemplified a method of coagulating the latex by adding, for example, (i) an alkaline earth metal salt such as calcium chloride, magnesium chloride, and magnesium sulfate; (ii) an alkali metal salt such as sodium chloride and sodium sulfate; (iii) an inorganic acid such as hydrochloric acid, sulfuric acid, and phosphoric acid; and (iv) an organic acid such as acetic acid and successively subjecting the coagulated slurry to dehydrate and dry. Further, a freeze coagulation method and a spray drying method may also be employed.

The graft ratio of the obtained polyorganosiloxane-containing graft copolymer (C) is less than 1% and preferably 0.5% or lower. If the graft ratio is 1% or higher, the effect to improve the mold release ability and the slidability tends to be lowered. The graft ratio (%) of the polyorganosiloxane-containing graft copolymer (C) of the present invention is calculated from the following equation.

Graft ratio=((weight(g) of acetone-insoluble matter of a sample-sample weight(g)×(part by weight of loaded polyorganosiloxane($A$)/100))/(sample weight(g)×(part by weight of fed polyorganosiloxane($A$)/100))×100

In the present invention, the methyl ethyl ketone-insoluble matter of obtained polyorganosiloxane-containing graft copolymer (C) is 3% by weight or less, preferably 2.5% by weight or less, and more preferably 2.2% by weight or less. If the methyl ethyl ketone-insoluble matter exceeds 3% by weight, the effect to improve the mold release ability and the slidability tends to be decreased.

The thermoplastic resin (D) of the present invention to be used in the case of improving the mold release ability is a thermoplastic resin containing no rubber component and as specific examples, there may be mentioned such as polystyrene (PS), styrene-acrylonitrile copolymer (AS), styrene-methyl methacrylate copolymer (MS), polycarbonate, polyamide, polybutylene terephthalate, and polyethylene terephthalate and these resins may be used alone or two or more of them may be used in combination.

As specific examples of the thermoplastic resin mixed with an inorganic filler such as glass fiber are thermoplastic resin containing no rubber component such as polystyrene (PS), styrene-acrylonitrile copolymer (AS), styrene-methyl methacrylate copolymer (MS), polycarbonate, polyamide, polybutylene terephthalate, and polyethylene terephthalate; and thermoplastic resin containing rubber components such as, impact resistant polystyrene (HIPS), ABS resin containing styrene-butadiene-acrylonitrile copolymer, heat resistant ABS resin obtained by replacing a portion or almost all of styrene of the above-mentioned ABS resin with α-methylstyrene or maleimide, (heat resistant) AES resin and (heat resistant) AAS resin obtained by replacing the butadiene with ethylene-propylene rubber or polybutyl acrylate. These resins may be used alone or two or more of them may be used in combination.

These thermoplastic resins may be used in combination with inorganic filler. The inorganic filler may be classified into fibrous, granular, and powder type fillers. Examples of fibrous filler may be glass fiber, carbon fiber, whisker, and mica. On the other hand, granular and powder fillers may be talc, silica, mica, calcium sulfate, calcium carbonate, magnesium carbonate, barium carbonate, magnesium sulfate, barium sulfate, kaolin, glass powder, glass flakes, and glass beads. They may be used alone or two or more of them may be used in combination.

The blending amount of the thermoplastic resin (D) with the above-mentioned polyorganosiloxane-containing graft copolymer (C) are, in terms of the mold release ability, preferably 99.99 to 97% by weight of the thermoplastic resin (D) and 0.01 to 3% by weight of the polyorganosiloxane-containing graft copolymer (C) and more preferably 99.99 to 99% by weight of (D) and 0.01 to 1% by weight of (C). If the blending amount of the polyorganosiloxane-containing graft copolymer (C) is less than 0.01% by weight, the effect to improve the mold release property tends to be lowered and if it exceeds 3% by weight, the improvement effect tends to be saturated and therefore, it is not economically preferable. The total amount of (C) and (D) is 100% by weight.

In the case of improving the slidability, as the thermoplastic resin (D) of the present invention, there may be mentioned polystyrene (PS), impact resistant polystyrene (HIPS), styrene-acrylonitrile copolymer (AS), ABS resin containing styrene-butadiene-acrylonitrile copolymer, heat resistant ABS resin obtained by replacing a portion or almost all of styrene of the above-mentioned ABS resin with α-methylstyrene or maleimide, (heat resistant) AES resin and (heat resistant) AAS resin obtained by replacing the butadiene with ethylene-propylene rubber or polybutyl acrylate, styrene-methyl methacrylate copolymer (MS), polycarbonate, polyamide, polybutylene terephthalate, and polyethylene terephthalate and the like. These resins may be used alone or two or more of them may be used in combination.

The blending amount of the above-mentioned polyorganosiloxane-containing graft copolymer (C) to the thermoplastic resin (D) is, in terms of the slidability, are preferably 99.99 to 95% by weight of the thermoplastic resin (D) and 0.01 to 5% by weight of the polyorganosiloxane-containing graft copolymer (C) and more preferably 99.99 to 96.5% by weight of (D) and 0.01 to 3.5% by weight of (C) and, also in terms of the mold release ability, even more preferably 99.99 to 97% by weight of (D) and 0.01 to 3% by weight of (C). If the blending amount of the polyorganosiloxane-containing graft copolymer (C) is less than 0.01% by weight, the effect to improve the slidability tends to be lowered and if it exceeds 5% by weight, the improvement effect tends to be saturated and therefore, it is not economically preferable.

The dynamic friction coefficient representing slidability of a molded body obtained from the thermoplastic resin composition of the present invention is preferably 0.22 or lower, more preferably 0.20 or lower, and even more preferably 0.18 or lower, If the dynamic friction coefficient exceeds 0.22, the molded body is inferior in the slidability and therefore it is not undesirable.

The thermoplastic resin (D) and the polyorganosiloxane-containing graft copolymer (C) may be mixed with each other by mixing them by a Henschel mixer, a ribbon blender, or a super floater and then kneading them with a melting and kneading apparatus such as rolls, a monoaxial extruder, a biaxial extruder, and a kneader.

In this case, additives to be used commonly, that is, a pigment, a coloring agent, a heat stabilizer, an antioxidant, a plasticizer, a lubricant, a UV absorbent, a photostabilizer, and an antistatic agent and the like may be added.

A molding method of the resin composition may be molding methods which are employed generally for molding a thermoplastic resin composition, that is, such as an injection molding method, an extrusion molding method, a blow molding method, and a calendar molding method.

EXAMPLES

Hereinafter, the present invention will be described more in detail along with Examples, however it is not intended that the invention be limited to the illustrated Examples. The evaluation methods in Examples and Comparative Examples are described collectively below.

(Polymerization Conversion Ratio)

A certain amount of obtained latex was sampled and dried by a hot air dryer at 120° C. for 1 hour to measure the solid content weight and the conversion ratio was calculated according to (weight of solid content in latex/weight of fed monomer in latex)×100%.

(Volume Average Particle Diameter)

The volume average particle diameter of the obtained polyorganosiloxane particles is measured in a latex state. The volume average particle diameter (μm) was measured by a light scattering method using MICROTRAC UPA manufactured by LEED & NORTHRUP INSTRUMENTS as a measurement apparatus.

(Powder Characteristics)

The obtained polyorganosiloxane-containing graft copolymer latex was coagulated, dehydrated and dried to give a polyorganosiloxane-containing graft copolymer in powder state, the powder state of polyorganosiloxane-containing graft copolymer was evaluated according to the following evaluating criteria.

⊚: the powder surface did not adhesive feeling thereby the resulting powder was in a good condition;

x: latex became bulky and no powder was obtained.

(Graft Ratio)

About 1 g of obtained polyorganosiloxane-containing graft copolymer powder was precisely weighed and dissolved in 100 ml of acetone and shaken at a room temperature and 1500 cpm for 2 hours using a shaking apparatus (SR-11, manufactured by Taiyo Kagaku Kogyo Co., Ltd.). The obtained solution was centrifuged at 23000 rpm for 30 minutes by a centrifuge separator (SCP 70H, manufactured by Hitachi Ltd.) and separated into the acetone-insoluble matter and soluble matter by decantation. The acetone-insoluble matter was vacuum dried at 70° C. for 11 hours and the weight was measured.

The graft ratio (%) of the polyorganosiloxane-containing graft copolymer was calculated according to the following equation.

graft ratio=[(weight(g) of acetone-insoluble matter of a sample−sample weight(g)×(part by weight of fed polyorganosiloxane($A$)/100))/(sample weight (g)×(part by weight of fed polyorganosiloxane ($A$)/100))]×100

(Methyl Ethyl Ketone-insoluble Matter)

About 1 g of obtained polyorganosiloxane-containing graft copolymer powder was precisely weighed and about 40 ml of methyl ethyl ketone was added and the resulting mixture was left at a room temperature for 12 hours and then stirred for 30 minutes by a magnetic stirrer. The obtained solution was centrifuged at 30000 rpm for 1 hour by a centrifuge separator (CP 60E centrifuge separator for classification, manufactured by Hitachi Ltd.) and separated into the methyl ethyl ketone-insoluble matter and soluble matter by decantation. Further, 20 ml of methyl ethyl ketone was added to the methyl ethyl ketone-insoluble matter and centrifugation and decantation were repeated twice in the same manner to separate methyl ethyl ketone-insoluble matter and soluble matter. After the resulting methyl ethyl ketone-insoluble matter was dried at 60° C. for 10 hours, the weight was measured.

The methyl ethyl ketone-insoluble matter (% by weight) of the polyorganosiloxane-containing graft copolymer was calculated according to the following equation.

Methyl ethyl ketone-insoluble matter(% by weight)= (weight(g) of methyl ethyl ketone-insoluble matter/weight(g) of sample)×100

(Mold Release Ability)

Each obtained pellet type resin composition was molded into an ASTM-1 dumbbell (3 mm thickness) using an injection molding apparatus (FAS-75D, manufactured by FANUC LTD.) in conditions of a cylinder temperature 240° C., a tool (molding) temperature 40° C., an injection speed 25 mm/sec, an injection time 5 sec, and cooling time 25 sec and the molded body was formed in conditions of an ejector forwarding speed 50 mm/sec and ejector forwarding position 35 mm and the state that the molded body was released from the mold by ejection of ejector pins was observed. The ejector pins were arranged at two positions to make the molded body easy to be separated from the mold. If the retention pressure is low, the molded body is easily separated from the mold by extrusion of the ejector pins. However as the retention pressure is increased more, the molded body become more difficult to be separated from the mold and finally could not be separated from the mold even if the ejection pins are extruded. The retention pressure (hereinafter, the retention pressure is referred to as "retention pressure difficult for mold release") was measured at the moment the molded body was apparently seen not separated from the mold even if the ejector pins were extruded. The retention pressures difficult for mold release of a resin composition containing the polyorganosiloxane-containing graft copolymer and a resin composition containing no polyorganosiloxane-containing graft copolymer were compared. The evaluation criterion for mold release ability was as follows.

○: the difference of the retention pressures difficult for mold release was 200 kg/cm²f or higher;

Δ: the difference of the retention pressures difficult for mold release was 50 to 200 kg/cm²f;

x: the difference of the retention pressures difficult for mold release was lower than 50 kg/cm²f.

[Surface Appearance of Molded Body]

Each obtained pellet type resin composition was molded continuously into 20 flat plates with a size of (100×150 mm, thickness 2 mm) using an injection molding apparatus (FAS-100B, manufactured by FANUC LTD.) in condition of a cylinder temperature 240° C. and the surface of the molded bodies was evaluated by visual observation according to the following criteria.

○: no surface defect (occurrence of black streaks) was observed in any of 20 flat plates x: black streak-like surface defect was observed in one or more flat plates

[Slidability]

The dynamic friction coefficient representing the slidability was measured at 500 g load and 20 mm/min using a contactor made of the same material (10×10 mm) and a surface property tester (HEIDON-14D, manufactured by SHINTO KAGAKU Co., Ltd.).

(A) Production Of Polyorganosiloxane-containing Graft Copolymer

Production Example 1

Production of Polyorganosiloxane-containing Graft Copolymer (C-1)

An emulsion obtained by stirring a mixture of 300 parts by weight of pure water, 99.86 parts by weight of octamethylcyclotetrasiloxane, 0.14 parts by weight of 3-methacryloxypropylmethyldimethoxysilane, and 5.0 parts by weight (solid content) of dodecylbenzenesulfonic acid sodium salt at 7000 rpm for 5 minutes with a homomixer (M-model, manufactured by TOKUSHU KIKA KOGYO) was fed at one time to a reactor equipped with a stirrer, a reflux condenser, a nitrogen blowing inlet, a monomer addition port, and a thermometer.

Next, 1.5 parts by weight of dodecylbenzenesulfonic acid in form of an aqueous 10 wt. % solution was added and the mixture was heated to 80° C. while being stirring in nitrogen current. After stirring was continued at 80° C. for 10 hours, the mixture was cooled to 23° C. and kept still for 20 hours. After that, an aqueous sodium hydroxide was added to adjust the pH of the obtained latex at 6.5 and polymerization was finished to obtain polyorganosiloxane (A-1) latex. The volume average particle diameter of the obtained polyorganosiloxane (A-1) in the latex was 0.09 μm.

Successively, a reactor equipped with a stirrer, a reflux condenser, a nitrogen blowing inlet, a monomer addition port, and a thermometer was loaded with 250 parts by weight of pure water and 85 parts by weight (solid content) of the above-mentioned polyorganosiloxane (A-1) latex and the mixture was heated to 60° C. in nitrogen current while being stirred. After heating to 60° C., 0.2 parts by weight of sodium formaldehydesulfoxylate, 0.01 parts by weight of disodium ethylenediaminetetraacetate, and 0.0025 parts by weight of ferrous sulfate (heptahydrate) were added and successively a mixture containing 4 parts by weight of acrylonitrile, 11 parts by weight of styrene, and 0.03 parts by weight of cumene hydroperoxide was dropwise additionally added for 2 hours and on completion of addition, the mixture was continuously stirred for 2 hours to obtain graft copolymer (C-1) latex. The polymerization conversion ratio was 99%.

The obtained latex was mixed with 4 parts by weight of calcium chloride in form of an aqueous 5 wt. % solution to obtain a coagulated slurry. Next, after the coagulated slurry was heated to 95° C., the slurry was cooled to 50° C., dehydrated, and dried to obtain powder state polyorganosiloxane-containing graft copolymer (C-1).

Production Examples 2 to 10)

Polyorganosiloxane-containing Graft Copolymers (C-2) to (C-10)

Polyorganosiloxane latexes (A-2) to (A-5) were produced from the organosiloxane and 3-methacryloxypropylmethyldimethoxysilane at the composition ratios shown in Table 1 in the same manner as Production Example 1.

Powder state polyorganosiloxane-containing graft copolymers (C-2) to (C-10) were obtained in the same manner as Production Example 1, except that the composition ratios of the polyorganosiloxane (A) latex and vinyl monomer (B) were changed as shown in Table 2.

Production Examples 11 to 13

Polyorganosiloxane-containing Graft Copolymers (C-11) to (C-13)

Polyorganosiloxane latexes (A-6) and (A-7) were obtained in the same manner as Production Example 1, except that the graft crosslinking agent to be used at the time of polyorganosiloxane production was changed from 3-methacryloxypropylmethyldimethoxysilane to 3-mercaptopropyldimethoxymethylsilane as shown in Table 1.

Powder state polyorganosiloxane-containing graft copolymers (C-11) to (C-13) were obtained in the same manner as Production Example 1, except that the obtained polyorganosiloxane latexes (A-6) and (A-7) were used as shown in Table 2.

The polymerization compositions and volume average particle diameters of the polyorganosiloxanes (A-1) to (A-7) are shown in Table 1.

TABLE 1

| Polymerization composition of polyorganosiloxane (A) | | A-1 | A-2 | A-3 | A-4 | A-5 | A-6 | A-7 |
|---|---|---|---|---|---|---|---|---|
| Organosiloxane | Octamethylcyclotetrasiloxane | 99.86 | 99.81 | 99.8 | 99.5 | 98 | 99.9 | 97.5 |
| Graft crosslinking agent | 3-Methacryloxypropylmethyldimethoxysilane | 0.14 | 0.19 | 0.2 | 0.5 | 2 | | |
| | 3-Mercaptopropyldimethoxymethylsilane | | | | | | 0.1 | 2.5 |
| Sodium dodecylbenzenesulfonate | | 5 | 0.5 | 5 | 2 | 5 | 2 | 2 |
| Volume average particle diameter (μm) | | 0.09 | 0.19 | 0.09 | 0.14 | 0.09 | 0.14 | 0.14 |

The monomer compositions, polymerization conversion ratios, powder characteristics (state), graft ratio, and methyl ethyl ketone-insoluble matter of the polyorganosiloxane-containing graft copolymers (C-1) to (C-13) are shown in Table 2.

TABLE 2

| Polymerization composition of graft copolymer (C) | | C-1 | C-2 | C-3 | C-4 | C-5 | C-6 |
|---|---|---|---|---|---|---|---|
| (A) | Polyorganosiloxane (A-1) | 85 | 70 | 91 | 50 | | |
| | Polyorganosiloxane (A-2) | | | | | 85 | |
| | Polyorganosiloxane (A-3) | | | | | | 80 |
| | Polyorganosiloxane (A-4) | | | | | | |
| | Polyorganosiloxane (A-5) | | | | | | |
| | Polyorganosiloxane (A-6) | | | | | | |
| | Polyorganosiloxane (A-7) | | | | | | |
| (B) | Acrylonitrile | 4 | 7.5 | 2.3 | 12.5 | 4 | 5 |
| | Styrene | 11 | 22.5 | 6.7 | 37.5 | 11 | 15 |
| | Cumene hydroperoxide | 0.03 | 0.06 | 0.01 | 0.1 | 0.03 | 0.04 |
| Polymerization conversion ratio (%) | | 99 | 98 | 98 | 98 | 99 | 99 |
| Powder characteristics | | ◎ | ◎ | X | ◎ | ◎ | ◎ |
| Graft ratio (%) | | −6.5 | −2.7 | −7.1 | 1.8 | −6.2 | −5.9 |
| Methyl ethyl ketone-insoluble matter (% by weight) | | 0.2 | 0.7 | 0.1 | 4 | 0.3 | 0.2 |

| Polymerization composition of graft copolymer (C) | | C-7 | C-8 | C-9 | C-10 | C-11 | C-12 | C-13 |
|---|---|---|---|---|---|---|---|---|
| (A) | Polyorganosiloxane (A-1) | | | | | | | |
| | Polyorganosiloxane (A-2) | | | | | | | |
| | Polyorganosiloxane (A-3) | 91 | 50 | | | | | |
| | Polyorganosiloxane (A-4) | | | 85 | | | | |
| | Polyorganosiloxane (A-5) | | | | 80 | | | |
| | Polyorganosiloxane (A-6) | | | | | 80 | | 80 |
| | Polyorganosiloxane (A-7) | | | | | | 85 | |
| (B) | Acrylonitrile | 2.3 | 12.5 | 4 | 5 | 5 | 4 | 5 |
| | Styrene | 6.7 | 37.5 | 11 | 15 | 15 | 11 | 15 |
| | Cumene hydroperoxide | 0.01 | 0.1 | 0.03 | 0.04 | 0.05 | 0.03 | 0.04 |
| Polymerization conversion ratio (%) | | 98 | 98 | 99 | 99 | 98 | 99 | 98 |
| Powder characteristics | | X | ◎ | ◎ | ◎ | ◎ | ◎ | ◎ |
| Graft ratio (%) | | −6.9 | 1.8 | −3.2 | 4.0 | −6.0 | 3.3 | −6.0 |
| Methyl ethyl ketone-insoluble matter (% by weight) | | 0.1 | 4 | 57.6 | 85.8 | 0.1 | 86.7 | 0.1 |

Example 1

As a thermoplastic resin (D-1), 99.9 parts by weight of polystyrene (HF-77, manufactured by PS JAPAN) and 0.1 parts by weight of the polyorganosiloxane-containing graft copolymer (C-1) were mixed and blended by stirring for 5 minutes with a super floater (SFC-50, manufactured by Kawata Co., Ltd.). Further, using a bent type monoaxial extruder (HV-40-28, manufactured by Tabata Co., Ltd.), the mixture was melted and kneaded at a cylinder set temperature of 230° C. to obtain pellets of the resin composition. The obtained pellets were injection-molded into ASTM-1 dumbbell (3 mm thickness) using an injection molding apparatus (FAS-75D, manufactured by FANUC LTD.) and subjected to the mold release ability evaluation. The evaluation results are shown in Table 3.

Examples 2 to 4

Pellets were produced in the same manner as Example 1, except that the composition ratio of the polyorganosiloxane-containing graft copolymer and the thermoplastic resin were changed as shown in Table 3 and after that, the pellets were injection-molded and subjected to the mold release ability evaluation. The evaluation results are shown in Table 3.

Comparative Examples 1 to 4

Pellets were produced in the same manner as Example 1, except that the composition ratio of the polyorganosiloxane-containing graft copolymer and the thermoplastic resin were changed as shown in Table 3 and after that, the pellets were injection-molded and subjected to the mold release ability evaluation. The evaluation results are shown in Table 3.

With respect to Comparative Example 4, as shown in Table 2, the powder characteristics of the polyorganosiloxane-containing graft copolymer (C-3) were inferior and the mold release ability was not evaluated.

TABLE 3

|  |  |  | Example | | | | Comparative Example | | | |
|---|---|---|---|---|---|---|---|---|---|---|
|  |  |  | 1 | 2 | 3 | 4 | 1 | 2 | 3 | 4 |
| Resin composition | Thermoplastic resin | D-1 | 99.9 | 99.5 | 99.9 | 99.9 | 99.9 | 99.9 | 99.9 | 99.9 |
|  | Polyorganosiloxane-containing graft copolymer | C-1 | 0.1 |  |  |  |  |  |  |  |
|  |  | C-2 |  | 0.5 |  |  |  |  |  |  |
|  |  | C-3 |  |  |  |  |  |  |  | — |
|  |  | C-4 |  |  |  |  | 0.1 |  |  |  |
|  |  | C-5 |  |  | 0.1 |  |  |  |  |  |
|  |  | C-6 |  |  |  |  |  |  |  |  |
|  |  | C-7 |  |  |  |  |  |  |  |  |
|  |  | C-8 |  |  |  |  |  |  |  |  |
|  |  | C-9 |  |  |  |  |  | 0.1 |  |  |
|  |  | C-10 |  |  |  |  |  |  |  |  |
|  |  | C-11 |  |  |  | 0.1 |  |  |  |  |
|  |  | C-12 |  |  |  |  |  |  | 0.1 |  |
| Mold release ability |  |  | ○ | ○ | ○ | ○ | Δ | X | X | — |

Examples 5, 6 and Comparative Examples 5, 6

Pellets were produced in the same manner as Example 1, except that polystyrene was changed to styrene-methyl methacrylate copolymer (Estyrene MS MS-600, manufactured by Nippon Steel Chemical Co., Ltd.): a thermoplastic resin (D-2) and subjected to the mold release ability evaluation in the injection molding. The results are shown in Table 4.

TABLE 4

|  |  |  | Example | | Comparative Example | |
|---|---|---|---|---|---|---|
|  |  |  | 5 | 6 | 5 | 6 |
| Resin composition | Thermoplastic resin | D-2 | 99.95 | 99.5 | 99.95 | 99.7 |
|  | Polyorganosiloxane-containing graft copolymer | C-1 | 0.05 |  |  |  |
|  |  | C-2 |  | 0.5 |  |  |
|  |  | C-3 |  |  |  |  |
|  |  | C-4 |  |  |  |  |
|  |  | C-5 |  |  |  |  |
|  |  | C-6 |  |  |  |  |
|  |  | C-7 |  |  |  |  |
|  |  | C-8 |  |  |  |  |
|  |  | C-9 |  |  | 0.05 |  |
|  |  | C-10 |  |  |  |  |
|  |  | C-11 |  |  |  |  |
|  |  | C-12 |  |  |  | 0.3 |
| Mold release ability |  |  | ○ | ○ | X | X |

Examples 7, 8 and Comparative Examples 7, 8

Pellets were produced at a cylinder temperature of 280° C. in the same manner as Example 1, except that polystyrene was changed to polycarbonate (FN 2200A, manufactured by Idemitsu Petrochemical Co., Ltd.): a thermoplastic resin (D-3), injection molded at a cylinder temperature of 280° C., and subjected to the mold release ability evaluation. The results are shown in Table 5.

TABLE 5

|  |  |  | Example | | Comparative Example | |
|---|---|---|---|---|---|---|
|  |  |  | 7 | 8 | 7 | 8 |
| Resin composition | Thermoplastic resin | D-3 | 99.95 | 99.7 | 99.9 | 99.7 |
|  | Polyorganosiloxane-containing graft copolymer | C-1 | 0.05 |  |  |  |
|  |  | C-2 |  | 0.3 |  |  |
|  |  | C-3 |  |  |  |  |
|  |  | C-4 |  |  |  |  |
|  |  | C-5 |  |  |  |  |
|  |  | C-6 |  |  |  |  |
|  |  | C-7 |  |  |  |  |
|  |  | C-8 |  |  |  |  |
|  |  | C-9 |  |  | 0.1 |  |
|  |  | C-10 |  |  |  |  |
|  |  | C-11 |  |  |  |  |
|  |  | C-12 |  |  |  | 0.3 |
| Mold release ability |  |  | ○ | ○ | X | X |

Production Example 14

Thermoplastic Resin (D-4)

After a 100 L pressure resistant polymerization apparatus was loaded with 200 parts by weight of pure water and the inside of the polymerization apparatus was degassed and replace with nitrogen, 100 parts by weight of butadiene, 0.3 parts by weight of potassium rhodinate, 0.1 parts by weight of sodium rhodinate, 0.05 parts by weight of sodium carbonate, and 0.2 parts by weight of potassium persulfate were fed to the apparatus. The mixture was heated to 60° C. to start polymerization and the polymerization was completed for 30 hours. The obtained diene type rubber polymer in the latex had a volume average particle diameter of 0.23 μm and a polymerization conversion ratio of 95%.

Successively, a reactor equipped with a stirrer, a reflux condenser, a nitrogen blowing inlet, a monomer addition port, and a thermometer was loaded with 250 parts by weight of pure water and 70 parts by weight (solid content) of the above-mentioned diene type rubber polymer latex and the mixture was heated to 65° C. in nitrogen current while being stirred and after 0.2 parts by weight of sodium formaldehydesulfoxylate, 0.01 parts by weight of disodium ethylenediaminetetraacetate, and 0.0025 parts by weight of ferrous sulfate (heptahydrate) were added, a mixture containing 8 parts by weight of acrylonitrile, 22 parts by weight of styrene, and 0.3 parts by weight of cumene hydroperoxide was dropwise additionally added for 5 hours and on completion of additional addition, the mixture was continuously stirred at 65° C. for 2 hours to complete the polymerization and obtain diene type rubber-containing graft copolymer (d-1) latex. The polymerization conversion ratio was 98%.

On the other hand, a reactor equipped with a stirrer, a reflux condenser, a nitrogen blowing inlet, a monomer addition port, and a thermometer was loaded with 250 parts by weight of pure water and 0.5 parts by weight (solid content) of sodium palmitate and the mixture was heated to 70° C. in nitrogen current while being stirred. After heating to 70° C., 0.4 parts by weight of sodium formaldehydesulfoxylate, 0.01 parts by weight of disodium ethylenediaminetetraacetate, and 0.0025 parts by weight of ferrous sulfate (heptahydrate) were added and successively a mixture containing 28 parts by weight of acrylonitrile, 72 parts by weight of styrene, 0.2 parts by weight of cumene hydroperoxide, and 0.3 parts by weight of tert-dodecylmercaptan was dropwise additionally added for 8 hours. In this case, 0.5 parts by weight (solid content) of sodium palmitate was added each after 1.5 hours and 3 hours from starting the dropwise addition. On completion of additional addition, the mixture was continuously stirred at 70° C. for 2 hours to complete the polymerization and obtain polymer (d-2) latex. The polymerization conversion ratio was 98%.

After the obtained diene type rubber-containing graft copolymer (d-1) latex and the obtained polymer (d-2) latex were mixed at weight ratio (solid content) of 20:80 and 0.5 parts by weight of a phenol type antioxidant (AO-50, manufactured by Asahi Denka Kogyo K.K.) was added, 3 parts by weight of calcium chloride in form of an aqueous 5 wt. % solution was added to obtain a coagulated slurry. Next, after the coagulated slurry was heated to 95° C., the slurry was cooled to 50° C., dehydrated, and dried to obtain powder state thermoplastic resin (D-4).

Example 9

After 99.7 parts by weight of the obtained thermoplastic resin (D-4) and 0.3 parts by weight of the polyorganosiloxane-containing graft copolymer (C-1) were mixed and blended by stirring for 5 minutes with a Henschel mixer (SMV-20, manufactured by Kawata Co., Ltd.), 20 parts by weight of glass fiber (CS3PE-331, manufactured by Nitto Boseki Co., Ltd.) was added and blended by stirring for 30 seconds. Further, using a bent type monoaxial extruder (HV-40-28, manufactured by Tabata Co., Ltd.), the mixture was melted and kneaded at a cylinder set temperature of 250° C. to obtain pellets of the resin composition. The obtained pellets were injection-molded into ASTM-1 dumbbell (3 mm thickness) using an injection molding apparatus (FAS-75D, manufactured by FANUC LTD.) at a cylinder set temperature of 250° C. and subjected to the mold release ability evaluation. The evaluation results are shown in Table 6.

Example 10 and Comparative Examples 9, 10

Pellets were produced in the same manner as Example 9, except that the composition ratio of the polyorganosiloxane-containing graft copolymer and the thermoplastic resin were changed as shown in Table 6 and after that, the pellets were injection-molded and subjected to the mold release property evaluation. The evaluation results are shown in Table 6.

TABLE 6

|  |  |  | Example | | Comparative Example | |
|---|---|---|---|---|---|---|
|  |  |  | 9 | 10 | 9 | 10 |
| Resin composition | Thermoplastic resin | D-4 | 99.7 | 99.5 | 99.5 | 99.5 |
|  | Polyorganosiloxane- | C-1 | 0.3 |  |  |  |
|  | containing | C-2 |  | 0.5 |  |  |
|  | graft copolymer | C-3 |  |  |  |  |
|  |  | C-4 |  |  |  |  |

TABLE 6-continued

|  |  | Example | | Comparative Example | |
|---|---|---|---|---|---|
|  |  | 9 | 10 | 9 | 10 |
|  | C-5 |  |  |  |  |
|  | C-6 |  |  |  |  |
|  | C-7 |  |  |  |  |
|  | C-8 |  |  |  |  |
|  | C-9 |  |  | 0.5 |  |
|  | C-10 |  |  |  |  |
|  | C-11 |  |  |  |  |
|  | C-12 |  |  |  | 0.5 |
| Glass fiber |  | 20 | 20 | 20 | 20 |
| Mold release ability |  | ○ | ○ | X | X |

Production Example 15

Thermoplastic Resin (D-5)

A reactor equipped with a stirrer, a reflux condenser, a nitrogen blowing inlet, a monomer addition port, and a thermometer was loaded with 200 parts by weight of pure water and 0.7 parts by weight (solid content) of sodium palmitate and the mixture was heated to 45° C. in nitrogen current while being stirred and then 0.3 parts by weight of sodium formaldehydesulfoxylate, 0.01 parts by weight of disodium ethylenediaminetetraacetate, and 0.0025 parts by weight of ferrous sulfate (heptahydrate) were added. As first stage monomers, a mixture containing 75 parts by weight of butyl acrylate, 0.3 parts by weight of triallyl cyanurate, and 0.037 parts by weight of cumene hydroperoxide was dropwise additionally added continuously for 6 hours and on completion of the additional addition, the mixture was stirred at 45° C. for 1 hour. In this case, 0.25 parts by weight (solid content) of sodium palmitate was added each after 1.5 hours and 3 hours from starting the dropwise addition. Successively, as second stage monomers, a mixture containing 25 parts by weight of butyl acrylate, 0.4 parts by weight of triallyl cyanurate, and 0.013 parts by weight of cumene hydroperoxide was dropwise additionally added continuously for 3 hours and on completion of the additional addition, the mixture was stirred at 45° C. for 1 hour to complete the polymerization. The polymerization conversion ratio was 99%. The volume average particle diameter of the obtained acrylic rubber polymer in the latex was 0.092 μm.

Successively, a reactor equipped with a stirrer, a reflux condenser, a nitrogen blowing inlet, a monomer addition port, and a thermometer was loaded with 250 parts by weight of pure water and 50 parts by weight (solid content) of the above-mentioned acrylic rubber polymer latex and the mixture was heated to 65° C. in nitrogen current while being stirred and after 0.3 parts by weight of sodium palmitate, 0.2 parts by weight of sodium formaldehydesulfoxylate, 0.01 parts by weight of disodium ethylenediaminetetraacetate, and 0.0025 parts by weight of ferrous sulfate (heptahydrate) were added, a mixture containing 12 parts by weight of acrylonitrile, 38 parts by weight of styrene, and 0.3 parts by weight of cumene hydroperoxide was dropwise additionally added continuously for 5 hours and on completion of additional addition, the mixture was continuously stirred at 65° C. for 2 hours to complete the polymerization and obtain acrylic rubber-containing graft copolymer (d-3) latex. The polymerization conversion ratio was 98%.

On the other hand, a reactor equipped with a stirrer, a reflux condenser, a nitrogen blowing inlet, a monomer addition port, and a thermometer was loaded with 250 parts by weight of pure water and 0.5 parts by weight (solid content) of sodium palmitate and the mixture was heated to 70° C. in nitrogen current while being stirred. After heating to 70° C., 0.4 parts by weight of sodium formaldehydesulfoxylate, 0.01 parts by weight of disodium ethylenediaminetetraacetate, and 0.0025 parts by weight of ferrous sulfate (heptahydrate) were added and successively a mixture containing 29 parts by weight of acrylonitrile, 71 parts by weight of styrene, 0.2 parts by weight of cumene hydroperoxide, and 0.35 parts by weight of tert-dodecylmercaptan was dropwise additionally added for 8 hours. In this case, 0.5 parts by weight (solid content) of sodium palmitate was added each after 1.5 hours and 3 hours from starting the dropwise addition. On completion of additional addition, the mixture was continuously stirred at 70° C. for 2 hours to complete the polymerization and obtain polymer (d-4) latex. The polymerization conversion ratio was 98%.

After the obtained acrylic rubber-containing graft copolymer (d-3) latex and the obtained polymer (d-4) latex were mixed at weight ratio (solid content) of 60:40, 3 parts by weight of calcium chloride in form of an aqueous 5 wt. % solution (to 100 parts by weight of the resin solid content) was added to obtain a coagulated slurry. Next, after the coagulated slurry was heated to 95° C., the slurry was cooled to 50° C., dewatered, and dried to obtain powder state rubber-modified styrene resin (D-5).

Production Example 16

Thermoplastic Resin (D-6)

After the obtained diene type rubber-containing graft copolymer (d-1) latex and the obtained polymer (d-4) latex were mixed at weight ratio (solid content) of 20:80 and 0.5 parts by weight of a phenol type antioxidant (AO-50, manufactured by Asahi Denka Kogyo K.K.) was added, 3 parts by weight of calcium chloride in form of an aqueous 5 wt. % solution (to 100 parts by weight of the resin solid content) was added to obtain a coagulated slurry. Next, after the coagulated slurry was heated to 95° C., the slurry was cooled to 50° C., dehydrated, and dried to obtain powder state rubber-modified styrene resin (D-6).

Example 11

After 99 parts by weight of the rubber-modified styrene resin (D-5), 1 part by weight of the polyorganosiloxane-containing graft copolymer (C-6), 1 part by weight of the ethylenebisstearyl amide, and 0.2 parts by weight of a phenol type antioxidant (AO-20, manufactured by Asahi Denka Kogyo K.K.) were mixed and blended by stirring for 5 minutes with a Henschel mixer (SMV-20, manufactured by Kawata Co., Ltd.). Further, using a bent type monoaxial extruder (HV-40-28, manufactured by Tabata Co., Ltd.), the mixture was melted and kneaded at a cylinder set temperature of 230° C. to obtain pellets of the resin composition. The obtained pellets were injection-molded into test specimens using an injection molding apparatus at a cylinder set temperature of 240° C. and subjected to physical property evaluation. The evaluation results are shown in Table 7.

Examples 12, 13 and Comparative Examples 11 to 16

Pellets were produced in the same manner as Example 11, except that the polyorganosiloxane-containing graft copolymers and the rubber-modified styrene resins were changed as shown in Tables 7 and 8 and after that, the pellets were injection-molded into test specimens and subjected to the physical property evaluation. The evaluation results are shown in Tables 7 and 8.

Comparative Example 17

Pellets were produced in the same manner as Example 11, except that 1 part by weight silicone oil (SH-200 (viscosity 10000cST), manufactured by Dow Corning Toray Silicone Co., Ltd.) was used in place of the polyorganosiloxane-containing graft copolymer, and the pellets were injection-molded into test specimens and subjected to the physical property evaluation. The evaluation results are shown in Table 8.

TABLE 7

|  |  |  | Example | | |
|---|---|---|---|---|---|
|  |  |  | 11 | 12 | 13 |
| Resin composition | Thermoplastic resin | D-5 | 99 | 97 | |
|  |  | D-6 |  |  | 97 |
|  | Polyorganosiloxane-containing graft copolymer | C-1 | | | |
|  |  | C-2 | | | |
|  |  | C-3 | | | |
|  |  | C-4 | | | |
|  |  | C-5 | | | |
|  |  | C-6 | 1 | | 3 |
|  |  | C-7 | | | |
|  |  | C-8 | | | |
|  |  | C-9 | | | |
|  |  | C-10 | | | |
|  |  | C-11 | | | |
|  |  | C-12 | | | |
|  |  | C-13 | | 3 | |
|  | Silicone oil | SH-200 | | | |
| Appearance | | | ○ | ○ | ○ |
| Dynamic friction coefficient | | | 0.15 | 0.18 | 0.12 |

TABLE 8

|  |  |  | Comparative Example | | | | | | |
|---|---|---|---|---|---|---|---|---|---|
|  |  |  | 11 | 12 | 13 | 14 | 15 | 16 | 17 |
| Resin composition | Thermoplastic resin | D-5 | 100 | 99 | 99 | 99 | 90 | | 99 |
|  |  | D-6 | | | | | | 100 | |
|  | Polyorganosiloxane-containing graft copolymer | C-1 | | | | | | | |
|  |  | C-2 | | | | | | | |
|  |  | C-3 | | | | | | | |
|  |  | C-4 | | | | | | | |
|  |  | C-5 | | | | | | | |
|  |  | C-6 | | | | | 10 | | |
|  |  | C-7 | | 1 | | | | | |

TABLE 8-continued

|  |  | Comparative Example | | | | | | |
|---|---|---|---|---|---|---|---|---|
|  |  | 11 | 12 | 13 | 14 | 15 | 16 | 17 |
|  | C-8 |  |  | 1 |  |  |  |  |
|  | C-9 |  |  |  |  |  |  |  |
|  | C-10 |  |  |  | 1 |  |  |  |
|  | C-11 |  |  |  |  |  |  |  |
|  | C-12 |  |  |  |  |  |  |  |
| Silicone oil | SH-200 |  |  |  |  |  |  | 1 |
| Appearance |  | ○ | — | ○ | ○ | X | ○ | X |
| Dynamic friction coefficient |  | 0.33 | — | 0.25 | 0.24 | 0.10 | 0.45 | 0.20 |

A polyorganosiloxane-containing graft copolymer of the present invention is excellent in powder characteristics and a resin composition obtained by adding a small amount of the copolymer to a thermoplastic resin is excellent in the mold release ability of a molded body from a mold at the time of injection molding and the molded body is excellent in the surface appearance and slidability of the molded body.

INDUSTRIAL APPLICABILITY

Since a resin composition obtained by adding a small amount of a polyorganosiloxane-containing graft copolymer with a specified composition to a thermoplastic resin is excellent in the mold release ability and slidability at the time of molding, the composition may be used for positions and parts where these characteristics are required.

Applications of the resin composition may be exemplified interior and exterior parts of automobiles such as consol boxes, pillars, center panels, meter panels, control switch panels, column covers, radiator grills, wheel caps, wheel covers, external pillars, center pillars, lamp housings, door mirror housings, cowls for bicycles, door millers, steering, shift levers, pedals, door locks, various kinds of switches, door members, and seat belts; bearings of these parts, gear members, and pulley materials.

Applications of the resin composition may be further exemplified housing materials, bearing materials, gear materials, and pulley materials of office automation equipments such as game machines, telephones, cellular phones, laptop computers, desktop personal computers, printers, copying machines, facsimiles, and projectors.

Applications of the resin composition may be further exemplified housing materials, bearing materials, gear materials, and pulley materials of domestic electric appliances such as sorters, chassis and parts, television sets, refrigerators, room air conditioners, laundry machine, vacuum cleaners, lighting equipment, microwaves, fans, ventilation fans, and shavers.

Applications of the resin composition may be further exemplified plates, housing materials, bearing materials, gear materials, and pulley materials of AV appliances such as video decks and DVD players.

Applications of the resin composition may be further exemplified daily goods such as containers, stationery (ball-point pens and marker pens), pachinko, and toys.

Applications of the resin composition may be further exemplified housing materials, bearing materials, gear materials, and pulley materials of construction and residential parts such as toilet seats, toilet seat covers, tank, shower parts, pump parts, water supply and discharge ports, window frame sashes, floors, threshold sill materials, and handrails.

Applications of the resin composition may be further exemplified bearing materials, gear materials, and pulley materials of clocks, toys, cameras, blind materials, curtains, and various kinds of domestic articles.

Additionally, applications of the resin composition may be further exemplified seal materials of various kinds of bearings, various kinds of pumps, bearing materials, gear materials, and pulley materials of various industrial machines.

The invention claimed is:

1. A thermoplastic resin composition excellent in mold release ability and slidability comprising 0.01 to 5% by weight of a polyorganosiloxane-containing graft copolymer (C) and 99.99 to 95% by weight of a thermoplastic resin (D), wherein
the polyorganosiloxane-containing graft copolymer (C) is obtained by polymerizing 40 to 10 parts by weight of a vinyl monomer (B) in the presence of 60 to 90 parts by weight of a polyorganosiloxane (A) with a proviso that a sum of (A) and (B) is 100 parts by weight,
a graft ratio of the polyorganosiloxane-containing graft copolymer (C) is less 0.5% or less, and
a content of methyl ethyl ketone-insoluble matter in the polyorganosiloxane-containing graft copolymer (C) is 3% by weight or less.

2. The thermoplastic resin composition according to claim 1, wherein the vinyl monomer (B) is at least one selected from the group consisting of an aromatic vinyl monomer, a vinyl monomer cyanide, a (meth)acrylic acid ester monomer, a carboxyl group-containing vinyl monomer, and a maleimide monomer.

* * * * *